(12) United States Patent
Zheng

(10) Patent No.: US 11,485,672 B2
(45) Date of Patent: Nov. 1, 2022

(54) GLASS BOTTLE CUTTER BASED ON ELECTRIC HEATING

(71) Applicant: Qi Zheng, Xinning (CN)

(72) Inventor: Qi Zheng, Xinning (CN)

(*) Notice: Subject to any disclaimer, the term of this patent is extended or adjusted under 35 U.S.C. 154(b) by 0 days.

(21) Appl. No.: 17/369,966

(22) Filed: Jul. 8, 2021

(65) Prior Publication Data

US 2021/0331962 A1    Oct. 28, 2021

(51) Int. Cl.
*C03B 33/06*    (2006.01)
*C03B 33/10*    (2006.01)

(52) U.S. Cl.
CPC .............. *C03B 33/06* (2013.01); *C03B 33/10* (2013.01); *Y10T 225/304* (2015.04)

(58) Field of Classification Search
CPC ......... C03B 33/06; C03B 33/10; C03B 33/00; C03B 33/09; C03B 33/095; C03B 33/12; C03B 33/14
See application file for complete search history.

(56) References Cited

U.S. PATENT DOCUMENTS

| 3,318,500 | A | * | 5/1967 | Swanson | C03B 33/095 225/2 |
| 3,406,886 | A | * | 10/1968 | Wesel | C03B 33/095 225/2 |
| 3,902,643 | A | * | 9/1975 | Gelfman | C03B 33/14 82/47 |
| 6,055,829 | A | * | 5/2000 | Witzmann | C03B 33/0955 65/56 |
| 2005/0092134 | A1 | | 5/2005 | Funakubo | |
| 2008/0098854 | A1 | | 5/2008 | Goldstein | |
| 2016/0060086 | A1 | | 3/2016 | Blanchard et al. | |

* cited by examiner

*Primary Examiner* — Phong H Nguyen

(57) ABSTRACT

A glass bottle cutter based on electric heating comprises a base. A rotary bracket and a heating and cutting seat are disposed at two ends of an upper surface of the base respectively. A motor is disposed in the rotary bracket, and a rotating shaft of the motor is disposed outside the rotary bracket and is provided with a support plate. An adhesive pad allowing the bottom of a glass bottle to cling thereto is disposed on a surface of the support plate. A heating tube is disposed on an upper surface of the heating and cutting seat. The base is provided with a power access port and an internal circuit mainboard. The motor, the heating tube and the power access port are all electrically connected to the circuit mainboard.

8 Claims, 5 Drawing Sheets

GLASS BOTTLE CUTTER BASED ON ELECTRIC HEATING

BACKGROUND OF THE INVENTION

1. Technical Field

The invention relates to the technical field of glass bottle cutting devices, in particular to a glass bottle cutter based on electric heating.

2. Description of Related Art

Glass bottles are common packaging containers in daily life and are mainly used for storing different articles such as beverages. Generally, such glass bottles are discarded when not used for storing articles. When the glass bottles are recycled, small openings of the glass bottles will be cut into large openings, so that the glass bottles can be used for cultivating flowers and plants. Corresponding glass bottle cutters are used to cut the glass bottles.

At present, most existing glass bottle cutters are purely mechanical cutters. Specifically, when such cutters are used, a bottle has to be manually rotated on a frame and is then cut by a cutter bit for cutting glass. Since the bottle is cut completely manually, such cutters are inconvenient to use.

BRIEF SUMMARY OF THE INVENTION

In view of the defects of the prior art, the objective of the invention is to provide a glass bottle cutter based on electric heating.

To fulfill the above objective, the invention adopts the following technical solution:

A glass bottle cutter based on electric heating comprises a base, wherein a rotary bracket and a heating and cutting seat are disposed at two ends of an upper surface of the base respectively, a motor is disposed in the rotary bracket, a rotating shaft of the motor is disposed outside the rotary bracket and is provided with a support plate, an adhesive pad allowing the bottom of a glass bottle to cling thereto is disposed on a surface of the support plate, a heating tube is disposed on an upper surface of the heating and cutting seat, the base is provided with a power access port and an internal circuit mainboard, and the motor, the heating tube and the power access port are all electrically connected to the circuit mainboard.

Preferably, at least one roller set is disposed on the upper surface of the base and is located between the rotary bracket and the heating and cutting seat, and each roller set consists of two symmetrical rollers.

Preferably, the upper surface of the base is a slope, the rotary bracket is located at a bottom of the slope, and the heating and cutting seat is located at a top of the slope.

Preferably, the heating and cutting seat comprises a heating seat and support lugs mounted on the base, the heating tube is mounted on an upper surface of the heating seat, a pipe wall of one end of the heating tube is higher than the upper surface of the heating seat, stop collars are disposed at top ends of the support legs, ends of the heating seat are located in the stop collars, at least one spring is disposed between the heating seat and the base, and tinder the effect of the spring, the heating seat abuts against top ends of the stop collars.

Preferably, the rotary bracket is provided with a support frame, a locking notch is formed in a bottom of the support frame, at least one adjusting bolt penetrates into the locking notch, a plurality of bolt holes matched with the adjusting bolt are formed in the base, and the adjusting bolt is locked into the corresponding bolt hole to fixedly mount the support frame on the base.

Preferably, the locking notch is of a strip shape, and the adjusting bolt is able to slide leftwards or rightwards in the locking notch in a non-locked state.

Preferably, the adhesive pad is made of rubber or double-faced adhesive tape.

Preferably, a switch key is disposed on the base and is electrically connected to the circuit mainboard.

By adoption of the above solution, the base is used as a frame, the bottom of a glass bottle is supported by the support plate and clings to the adhesive pad, and the glass bottle is rotated by means of the driving force of the motor and does not need to be held or rotated manually, so that the operation is more convenient; the glass bottle is heated and cut by the heating tube at the other, and an original glass cutter for cutting is replaced, so that the cutting resistance is reduced; and the rollers are used as transfer supports to enable the glass bottle to rotate more smoothly, and manual control is avoided, so that the glass bottle can be cut more conveniently.

DETAILED DESCRIPTION OF THE INVENTION

Figure 1:
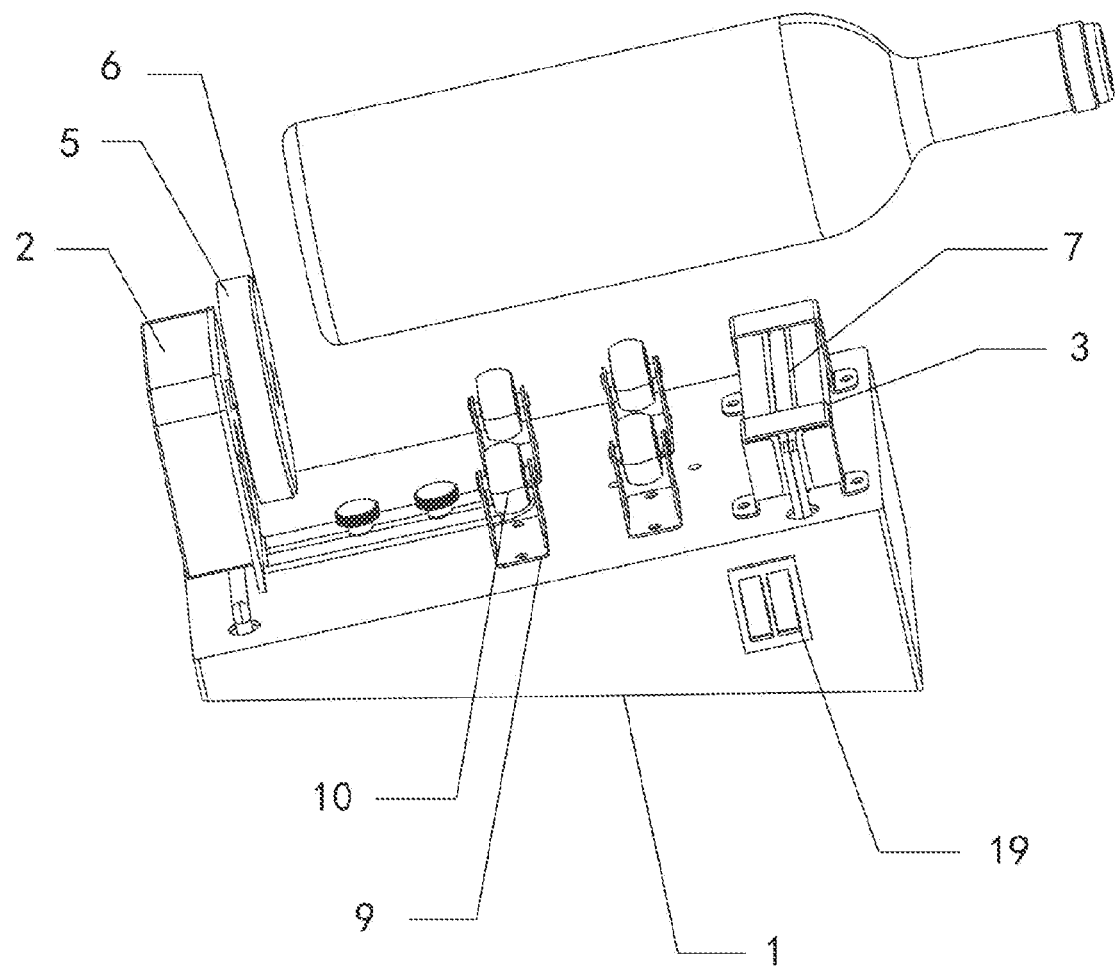
FIG. 1 is a structural principle diagram of an embodiment of the invention.
Figure 2:
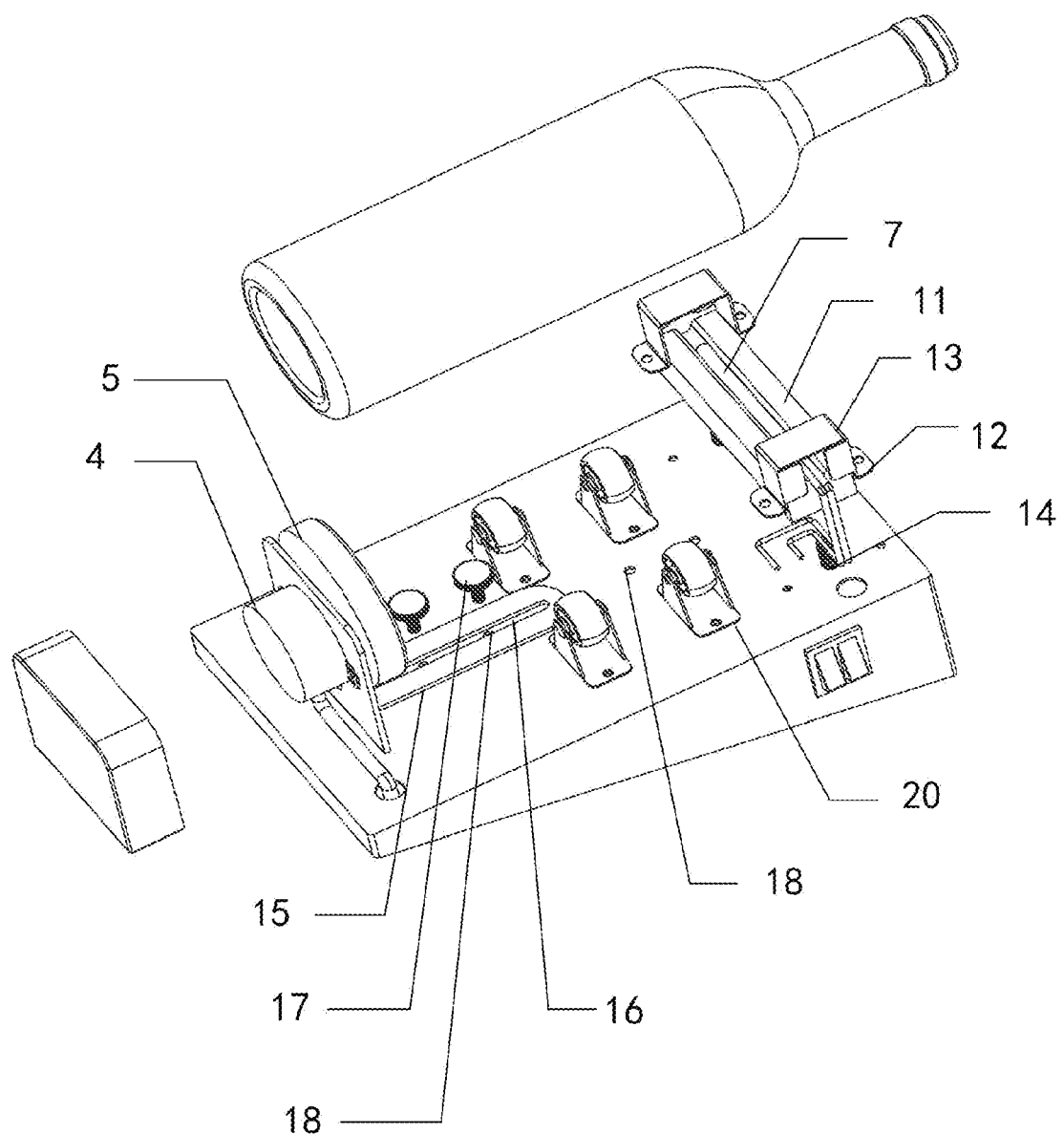
FIG. 2 is an exploded view of components of an embodiment of the invention.
Figure 3:
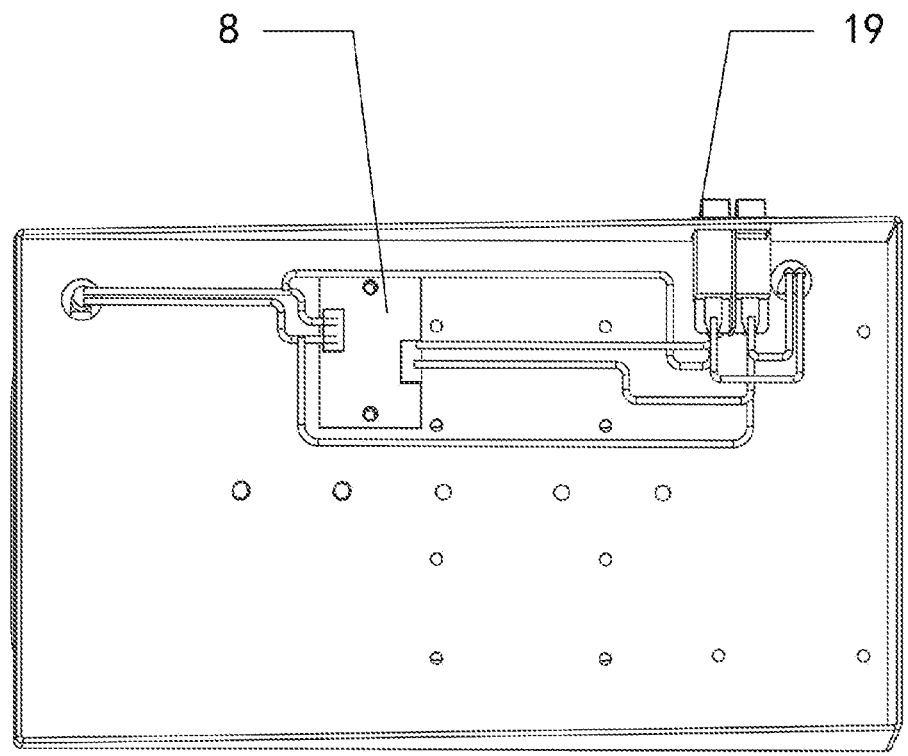
FIG. 3 is an internal structural diagram of a base in an embodiment of the invention.
Figure 4:
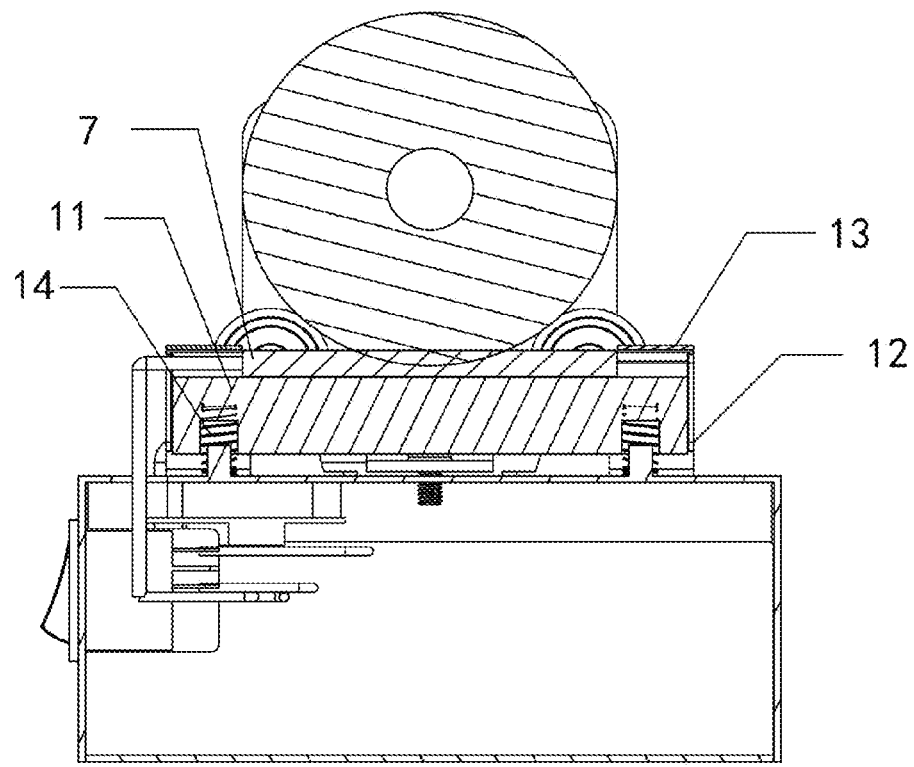
FIG. 4 is a sectional view of a heating and cutting seat in an embodiment of the invention.

The embodiments of the invention will be described in detail below in conjunction with the accompanying drawings. Clearly, the invention may be implemented in different manners defined and covered by the claims.

As shown in FIG. 1 to FIG. 5, this embodiment provides a glass bottle cutter based on electric heating, comprising a base 1, wherein a rotary bracket 2 and a heating and cutting seat 3 are disposed at two ends of an upper surface of the base 1 respectively, a motor 4 is disposed in the rotary bracket 2, a rotating shaft of the motor 4 is disposed outside the rotary bracket 2 and is provided with a support plate 5, an adhesive pad 6 allowing the bottom of a glass bottle to cling thereto is disposed on the surface of the support plate 5 and is made of rubber or double-faced adhesive tape, a heating tube 7 is disposed on an upper surface of the heating and cutting seat 3, the base 1 is provided with a power access port and an internal circuit mainboard 8, and the motor 4, the heating tube 7 and the power access port (not shown) are all electrically connected to the circuit mainboard 8.

In this embodiment, with the base 1 as a frame, the bottom of the glass bottle is supported by the support plate 5 and clings to the adhesive pad 6, and the glass bottle is rotated by means of a driving force of the motor and does not need to be held or rotated manually, so that the operation is more convenient; in addition, the glass bottle is heated and cut by the heating tube 7 at the other end, and an original glass cutter for cutting is replaced, so that the cutting resistance is reduced.

Further, considering that the glass bottle may get stuck or lost stability in the rotating process if it is supported only by the rotary bracket 2 and the heating and cutting seat 3, at least one roller set 9 is disposed on the upper surface of the base 1 and is located between the rotary bracket 2 and the heating and cutting seat 3, and each roller set 9 consists of two symmetrical rollers 10. The rollers 10, used as transfer supports, not only can rotatably support the glass bottles by means of rolling support, but also can limit the glass bottle, so that the glass bottle can rotate more smoothly.

Further, in this embodiment, to adapt to glass bottles of different sizes, a plurality of mounting sites 20 are disposed between the rotary bracket 2 and the heating and cutting seat 3 and correspond to the supports in different directions, so that when the roller sets 9 are mounted on the corresponding mounting sites 20, the glass bottle cutter can adapt to glass bottles of different sizes. Specifically, the mounting sites 20 may be directly assembled with metal fasteners such as bolts and screws.

Further, in this embodiment, to enable, the glass bottle to cling to the support plate 5 more firmly, the upper surface of the base 1 is a slope, the rotary bracket 2 is located at the bottom of the slope, and the heating and cutting seat 3 is located at the top of the slope, so that the glass bottle can cling to the support plate 5 more firmly by means of its gravity, and can be smoothly driven by the support plate 5 to rotate.

Further, the heating and cutting seat 3 comprises a heating seat 11 and support lugs 12 mounted on the base 1, the heating tube 7 is mounted on an upper surface of the heating seat 11, the pipe wall of one end of the heating tube 7 is higher than the upper surface of the heating seat 11, stop collars 13 are disposed at top ends of the support lugs 12, ends of the heating seat 11 are located in the stop collars 13, at least one spring 14 is disposed between the heating seat 11 and the base 1, and under the effect of the spring 14, the heating seat 11 abuts against top ends of the stop collars 13. By means of the spring 14, it is ensured that the heating tube 7 can be automatically adjusted in the moving process to always cling to the surface of the glass bottle.

Further, the rotary bracket 2 is provided with a support frame 15, a locking notch 16 is formed in the bottom of the support frame 15, at least one adjusting bolt 17 penetrates into the locking notch 16, a plurality of bolt holes 18 matched with the adjusting bolt 17 are formed in the base 1, and the adjusting bolt 17 is locked into the corresponding bolt hole 18 to fixedly mount the support frame 15 on the base 1. Moreover, to meet the requirement for cutting glass bottles of different heights or adjusting the cutting position, the locking notch 16 in this embodiment is of a strip shape, and the adjusting bolt 17 is able to slide leftwards or rightwards in the locking notch 16 in a non-locked state, so that the rotary bracket 2 can be adjusted according to different glass bottles and cutting positions to change the distance between the rotary bracket 2 and the heating and cutting seat 3, and thus, the requirements for changing the cutting position and cutting glass bottles of different heights are met.

In addition, in this embodiment, a switch key 19 is disposed on the base 1 and is electrically connected to the circuit mainboard 8. Users can start an operation easily by means of the switch key 19 during specific operation.

Figure 5:
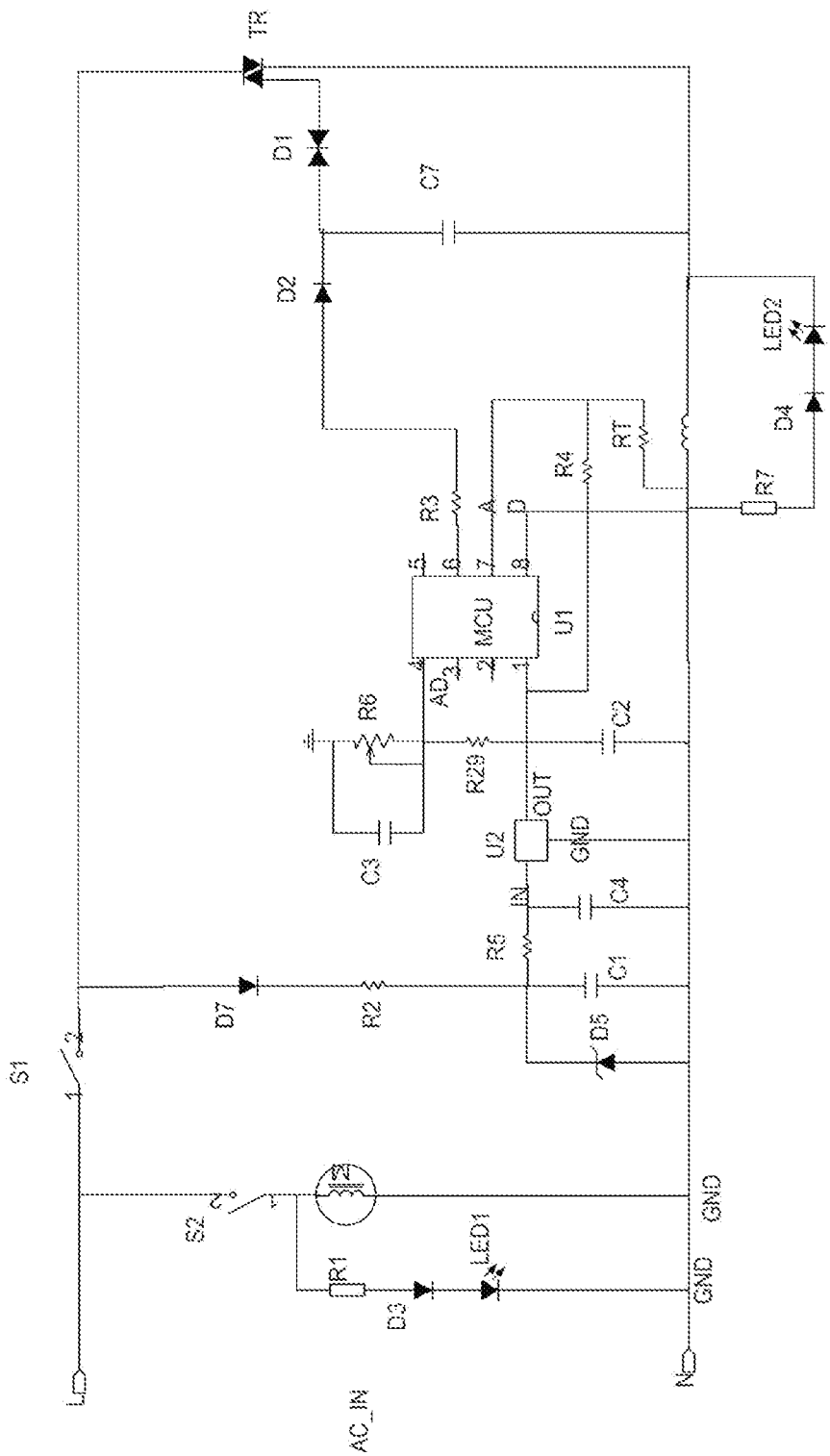
FIG. 5 is a structural diagram of a control circuit of an embodiment of the invention.

Moreover, it should be noted that the circuit mainboard 8 in this embodiment is integrated with a control circuit. As shown in FIG. 5 which illustrates the specific structure of the control circuit, the control circuit mainly comprises an MCU chip, a voltage stabilizer and a plurality of elements. The operating principle of the control circuit is as follows: two switches S1 and S2 are configured to constitute the switch key 19, different resistances of an adjustable resistor R6 are detected by the MCU chip, then a program in the MCU chip outputs duty ratios corresponding to different temperature settings, and a closed loop is formed according to corresponding resistances of a thermistor RT on the heating tube 7 under different temperatures to control the turn-on angle of a thyristor TR to realize a constant temperature under different temperature settings. The switch S2 is only responsible for starting or stopping the motor 4.

The specific working process of the circuit of the glass bottle cutter is as follows:

1. When the switch S2 is turned on, the motor starts to work, and an indicator light LED 1 connected to the switch S2 lights up to indicate that the motor is in an operating state.

2. When the switch S1 is turned on, an AC voltage is reduced by means of a voltage reduction circuit constituted by R2 and C1, and under the voltage stabilizing effect of a stabilivolt, it is ensured that a stable 8.1V voltage exists at an input terminal the three-terminal voltage stabilizer U2 HT7550, so that a stable 5V voltage is output to supply power to the MCU chip.

3. The adjustable resistor R6 has different resistances corresponding to different temperature settings. The MCU chip determines a corresponding temperature setting by detecting the AD value to output a corresponding PWM duty ratio to control different turn-on angles of the thyristor TR, and then, different, temperature outputs are controlled. In this operating state, the other indicator light LED2 indicates the operating state. When the thyristor TR is not completely turned on, the indicator light LED2 will not light up.

4. Under different temperature settings, the constant-temperature regulation process is realized by detecting the resistance of the thermistor RT on the heating tube.

The specific process is as follows:

1) At the beginning of heating, the thermistor RT has a low temperature and a high resistance, which are detected by the MCU chip to maintain a large turn-on angle to keep the thermistor RT on until the heating temperature rises close to a set value.

2) When the MCU chip detects that the temperature exceeds a set temperature, the turn-on angle is reduce to reduce heat transmitted from the thermistor RT to the heating tube 7, so that the temperature is decreased.

3) Constant-temperature control is realized by means of repeated dynamic regulation, so that the temperature is controlled to be stable.

The above embodiments are merely preferred ones of the invention, and are not intended to limit the patent scope of the invention. All equivalent structural transformations or flow transformations made according to the contents of the specification and the accompanying drawings, or direct or indirect applications to other relating technical fields should also fall within the protection scope of the patent of invention.

What is claimed is:

1. A glass bottle cutter based on electric heating, comprising a base, wherein a rotary bracket and a heating and cutting seat are disposed at two ends of an upper surface of the base respectively, a motor is disposed in the rotary bracket, a rotating shaft of the motor is disposed outside the rotary bracket and is provided with a support plate, an adhesive pad allowing a bottom of a glass bottle to cling thereto is disposed on a surface of the support plate, a heating tube is disposed on an upper surface of the heating and cutting seat, the base is provided with a power access port and an internal circuit mainboard, and the motor, the heating tube and the power access port are all electrically connected to the circuit mainboard.

2. The glass bottle cutter based on electric heating according to claim 1, wherein at least one roller set is disposed on the upper surface of the base and is located between the rotary bracket and the heating and cutting seat, and each said roller set consists of two symmetrical rollers.

3. The glass bottle cutter based on electric heating according to claim 2, wherein the upper surface of the base is a slope, the rotary bracket is located at a bottom of the slope, and the heating and cutting seat is located at a top of the slope.

4. The glass bottle cutter based on electric heating according to claim 3, wherein the heating and cutting seat comprises a heating seat and support lugs mounted on the base, the heating tube is mounted on an upper surface of the heating seat, a pipe wall of an end of the heating tube is higher than the upper surface of the heating seat, stop collars are disposed at top ends of the support legs, ends of the heating seat are located in the stop collars, at least one spring is disposed between the heating seat and the base, and under the effect of the spring, the heating seat abuts against top ends of the stop collars.

5. The glass bottle cutter based on electric heating according to claim 1, wherein the rotary bracket is provided with a support frame, a locking notch is formed in a bottom of the support frame, at least one adjusting bolt penetrates into the locking notch, a plurality of bolt holes matched with the adjusting bolt are formed in the base, and the adjusting bolt is locked into the corresponding bolt hole to fixedly mount the support frame on the base.

6. The glass bottle cutter based on electric heating according to claim 5, wherein the locking notch is of a strip shape, and the adjusting bolt is able to slide leftwards or rightwards in the locking notch in a non-locked state.

7. The glass bottle cutter based on electric heating according to claim 1, wherein the adhesive pad is made of rubber or double-faced adhesive tape.

8. The glass bottle cutter based on electric heating according to claim 1, wherein a switch key is disposed on the base and is electrically connected to the circuit mainboard.

* * * * *